US011233556B2

(12) United States Patent
Paramesh et al.

(10) Patent No.: US 11,233,556 B2
(45) Date of Patent: *Jan. 25, 2022

(54) RECONFIGURABLE FULLY-CONNECTED BIDIRECTIONAL HYBRID BEAMFORMING TRANSCEIVER

(71) Applicant: Carnegie Mellon University, Pittsburgh, PA (US)

(72) Inventors: Jeyanandh Paramesh, Pittsburgh, PA (US); Susnata Mondal, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,746

(22) Filed: Dec. 7, 2020

(65) Prior Publication Data

US 2021/0111777 A1  Apr. 15, 2021

Related U.S. Application Data

(63) Continuation of application No. 16/677,072, filed on Nov. 7, 2019, now Pat. No. 10,951,295, which is a continuation-in-part of application No. 16/163,374, filed on Oct. 17, 2018, now Pat. No. 10,707,947.

(60) Provisional application No. 62/766,884, filed on Nov. 7, 2018.

(51) Int. Cl.
*H04B 7/06* (2006.01)
*H04B 7/08* (2006.01)

(52) U.S. Cl.
CPC ........ *H04B 7/0686* (2013.01); *H04B 7/0617* (2013.01); *H04B 7/0634* (2013.01); *H04B 7/0842* (2013.01); *H04B 7/0868* (2013.01)

(58) Field of Classification Search
CPC .. H04B 7/0686; H04B 7/0634; H04B 7/0842; H04B 7/0868; H04B 7/0617
See application file for complete search history.

(56) References Cited

U.S. PATENT DOCUMENTS

| | | | |
|---|---|---|---|
| 7,113,748 B2 * | 9/2006 | Shapira | H01Q 1/246 342/361 |
| 8,224,387 B2 * | 7/2012 | Bishop | H04B 7/0617 455/562.1 |
| 9,094,102 B2 | 7/2015 | Corman et al. | |
| 9,640,866 B2 | 5/2017 | Kumar | |
| 10,256,865 B2 | 4/2019 | Perumana et al. | |
| 10,256,894 B2 | 4/2019 | Eitan et al. | |
| 10,608,678 B1 | 3/2020 | Hormis et al. | |
| 10,848,116 B2 | 11/2020 | Wu et al. | |
| 2002/0173337 A1 | 11/2002 | Hajimiri et al. | |
| 2007/0280387 A1 | 12/2007 | Li et al. | |
| 2014/0376657 A1 | 12/2014 | Agee et al. | |

(Continued)

*Primary Examiner* — Freshteh N Aghdam
(74) *Attorney, Agent, or Firm* — Kacvinsky Daisak Bluni PLLC

(57) ABSTRACT

Disclosed herein is a new type of fully-connected, hybrid beamforming transceiver architecture. The transceiver described herein is bi-directional and can be configured as a transmit beamformer or a receive beamformer. A method and apparatus are described that allows the beamformer to operate in "carrier aggregated" mode, where communication channels in multiple disparate frequency bands can be simultaneously accessed.

19 Claims, 8 Drawing Sheets

(56) References Cited

U.S. PATENT DOCUMENTS

| | | |
|---|---|---|
| 2016/0037560 A1 | 2/2016 | Liu et al. |
| 2018/0183509 A1* | 6/2018 | Luo ........................ H04B 7/002 |
| 2018/0287841 A1 | 10/2018 | Subramanian et al. |
| 2019/0115963 A1* | 4/2019 | Zhu ...................... H04B 7/0626 |
| 2019/0149276 A1* | 5/2019 | Xiong .................. H04L 5/0048 |
| | | 370/329 |
| 2019/0296821 A1 | 9/2019 | Choi et al. |
| 2019/0387504 A1* | 12/2019 | Jung .................... G06F 17/142 |
| 2021/0067118 A1 | 3/2021 | Patel et al. |
| 2021/0211248 A1 | 7/2021 | Moshfeghi |

\* cited by examiner

RECONFIGURABLE FULLY-CONNECTED BIDIRECTIONAL HYBRID BEAMFORMING TRANSCEIVER

RELATED APPLICATIONS

This application is a continuation of U.S. patent application Ser. No. 16/677,072, filed Nov. 7, 2019 and claims the benefit of U.S. Provisional Patent Filing No. 62/766,884, filed Nov. 7, 2018. Additionally, this application claims priority to U.S. patent application Ser. No. 16/163,374, filed Oct. 17, 2018 as a continuation-in-part. The contents of both previous applications are incorporated herein in their entirety.

GOVERNMENT RIGHTS

This invention was made with government support under National Science Foundation contracts Nos. CCF1314876, ECCS1343324, and ECCS1309927. The government has certain rights in this invention.

BACKGROUND OF THE INVENTION

Next generation wireless communication systems will depend on directional transmission and reception at millimeter-wave (mm-wave) frequencies to achieve higher data rates and network capacity. Electronically controlled multi-element antenna arrays are the most attractive way to implement such directional communication due to their size, weight, power and cost advantages.

When combined with advanced electronics implementing sophisticated spatial signal processing algorithms, antenna arrays can be exploited in new ways in future wireless networks. These techniques include point-to-point multiple-input-multiple-output (MIMO), multiuser MIMO and polarization-based MIMO, spatial equalization, spatial diversity and spatial interference cancellation or nulling.

The underlying hardware is referred to as beamforming transceivers or simply beamformers. Digital beamformers (DBF) are the most flexible type of beamformers and can, in principle, support advanced multi-antenna techniques, including those identified above. While DBF is feasible for low-element count antenna arrays below 6 GHz, it is often not feasible for mm-wave massive (i.e., high antenna count) MIMO due to its prohibitively large die area and power consumption. DBFs will not be feasible for the foreseeable future due to size, weight, power consumption and cost constraints especially for antenna arrays with large numbers of elements.

Therefore, current mm-wave beamformers are implemented using RF circuits (referred to as RF-domain beamformers) which perform complex-valued weighting (a simple form of spatial signal processing involving phase-shifting and amplitude-scaling the signal) of the incoming signals at each antenna element to steer the main lobe of the antenna pattern. However, these RF-domain beamformers are limited in their ability to support advanced multi-antenna techniques.

A hybrid beamforming architecture enables energy-efficient multi-stream operation by performing RF-spatial-processing using RF-domain gain and phase control, while also having multiple up-/down-conversion chains (each connected to an independent RF-beamforming module) that facilitate simultaneous communication of multiple data streams (i.e., multi-stream MIMO) using multiple beams. Hybrid beamforming is by default assumed to be of the partially-connected (PC-HBF) (or sub-array) type, as shown in View (a) of FIG. 1, where each data stream accesses only a fraction of the antenna elements available in the array.

Therefore, there is high current interest in multi-antenna communication using hybrid beamformers wherein the requisite spatial signal processing is partitioned between the RF domain and the digital domain. At the time of this filing, hybrid beamformers of the "partially-connected" type were being developed by various companies and academic research groups.

SUMMARY OF THE INVENTION

A "fully-connected" HBF (FC-HBF) receiver, as shown in View (b) of FIG. 1, is a beamformer where each data stream accesses all available antenna elements. The main advantage of PC-HBF's is that they can be implemented easily simply by replicating RF beamformers (i.e., phased arrays), however, they are inferior to FC-HBF's in terms of spectral efficiency. Furthermore, FC-HBF's are also superior in term of energy efficiency for a given level of performance. However, FC-HBF's face circuit design challenges due to their much greater complexity. An FC-HBF receiver is described in U.S. patent application Ser. No. 16/163,374 (U.S. Pub. Pat. App. No. 2019/0253126) by the current inventors.

This invention describes a new type of fully-connected, hybrid beamforming transceiver architecture. The transceiver described herein is bi-directional and can be configured as a transmit beamformer or a receive beamformer. Thus, the same hardware can be directly used in a time-division duplex system by reversibly configuring between the two modes. A method and apparatus are described that allows the beamformer to operate in "carrier aggregated" mode, where communication channels in multiple disparate frequency bands can be simultaneously accessed. Such operation is not possible in prior art beamformers. The architecture features simplified apparatus to tune the beamformer for the carrier aggregated operation described above. The beamformer features fully-connected hybrid beamforming in both transmit and receive modes. Unlike the partially-connected hybrid beamformer being developed by other groups, as described above, the invention described herein allows independent programmable processing on signals at each of a large number of antennas to be connected to every one of a handful of frequency translation chains. The fully-connected type offers significantly superior performance as opposed to the partially connected type. The architecture can be "tiled" to support larger beamforming arrays. With some tiles configured in transmit mode and other tiles configured in receive mode, simultaneous transmit-receive operation (STAR) can be supported. The beamformer can be operated in STAR mode with the transmitter and receiver tuned to different frequency bands. This is referred to herein as the STAR-Frequency Duplexed (STAR-FDD) mode. The beamformer can also be configured with the transmitter and receiver tuned to the same frequency channel in the same band. This is referred to herein as the STAR-Full Duplex mode (STAR-FUD) mode. In the full-duplex mode, the transmitter and the receiver operate simultaneously at the same frequency. Signal leakage from the transmitter can corrupt the signals passing through the receiver and destroy performance.

This invention describes a novel fully-connected type of hybrid beamformer. In contrast to partially connected hybrid beamformers, the architecture can be efficiently scaled to support multiple data streams without loss of performance.

Further, this architecture can achieve better energy efficiency for the same level of performance, leading to better thermal management, thereby reducing cost. Additionally, it supports a built-in mechanism to cancel transmit signal leakage from the transmit path into the receive path in a simultaneous-transmit-receive (full-duplex or frequency-division duplex) scenario, which is of high interest in future wireless networks. Lastly, the described beamformer is highly reconfigurable in terms of functionality and in its ability to support inter-band carrier aggregation (i.e., able to access streams at multiple frequencies simultaneously).

DETAILED DESCRIPTION OF THE INVENTION

Novel aspects of the invention include disclosure of a FC-HBF transmitter, the combination of the FC-HBF transmitter with a FC-HBF receiver to form a FC-HBF transceiver, carrier aggregation in FC-HBF, and simultaneous transmit-receive communication with the FC-HBF transceiver. These aspects of the invention are discussed below.

FC-HBF Transmitter

Figure 1:
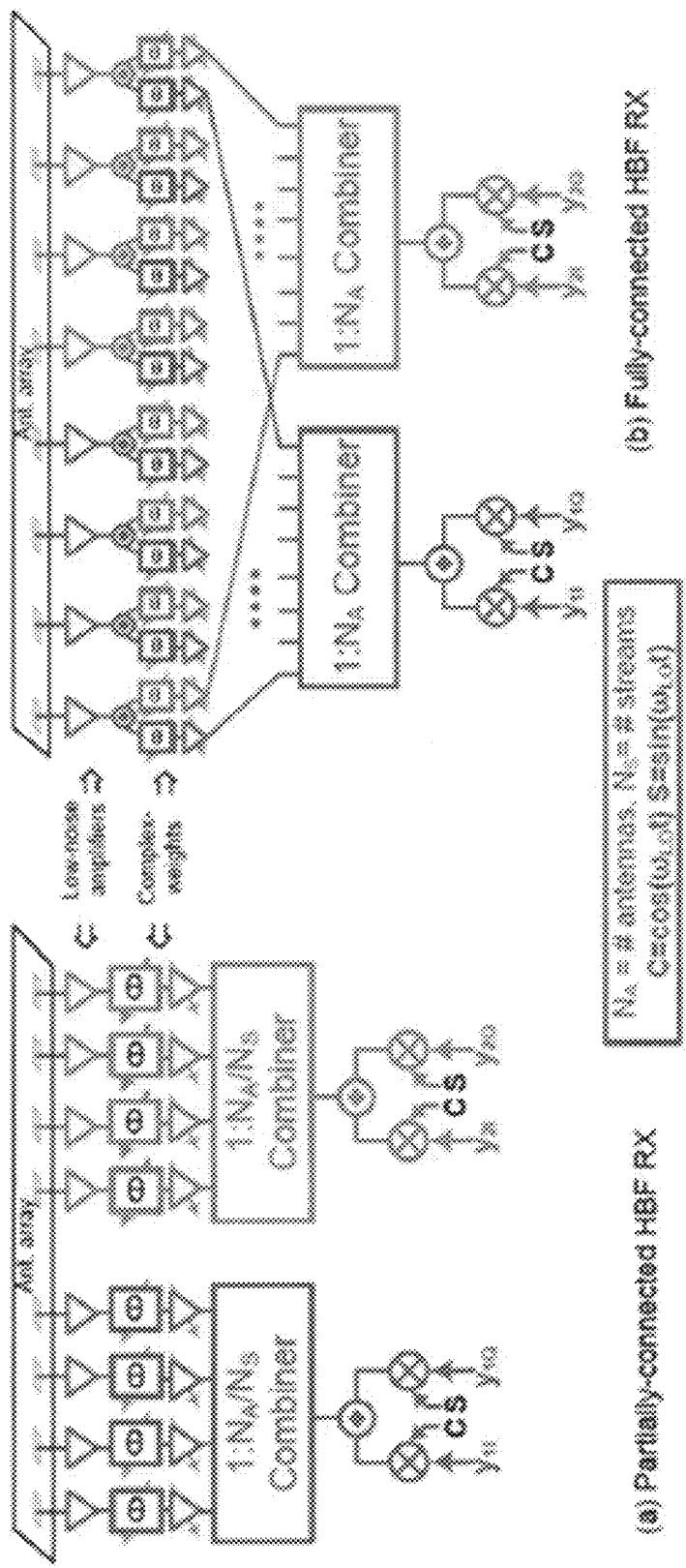
FIG. 1 shows, in View (a), a block diagram of a partially-connected beamforming receiver, and, in View (b), a block diagram of a fully-connected beamforming receiver.
Figure 2:
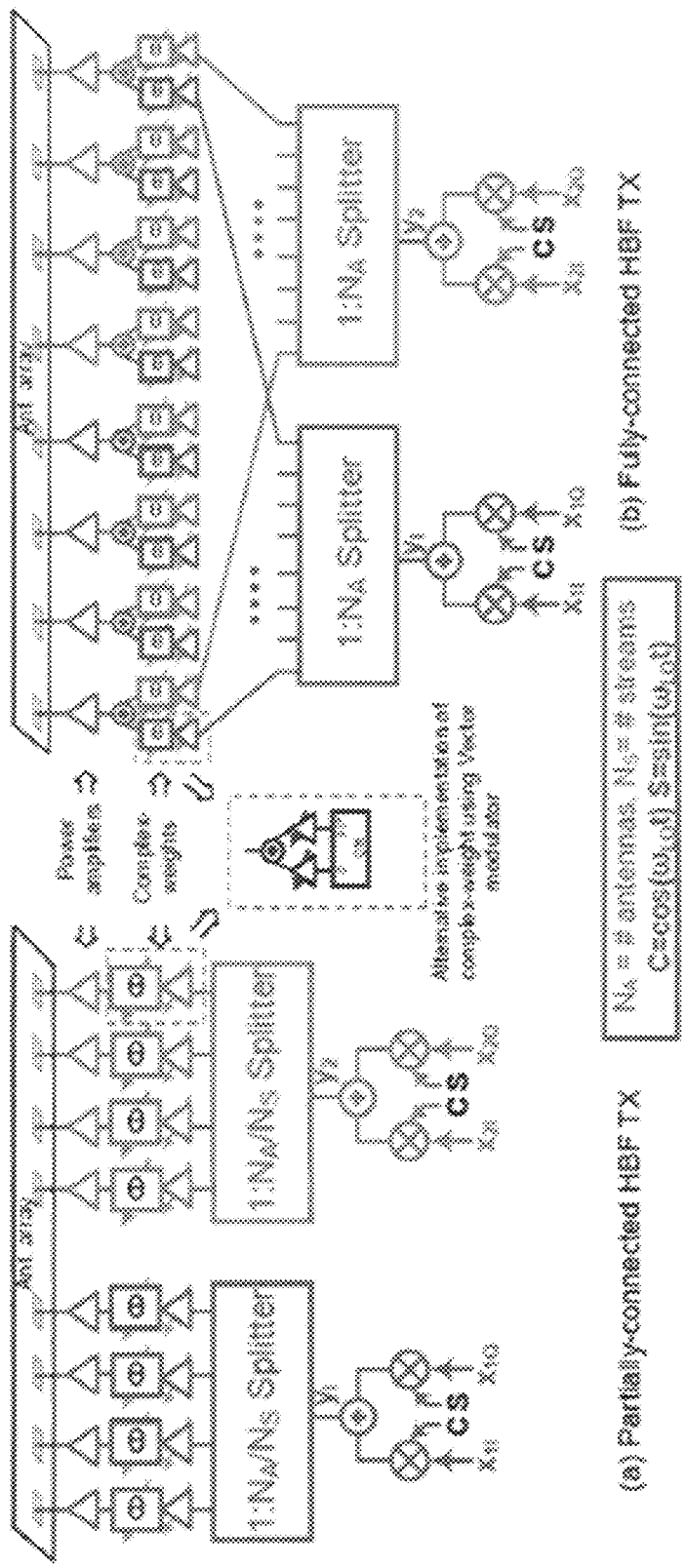
FIG. 2 shows, in View (a), a block diagram of a partially-connected beamforming transmitter, and, in View (b), a block diagram of a first embodiment of the invention showing a fully-connected beamforming transmitter.

A first embodiment of the FC-HBF transmitter described herein is illustrated in View (b) of FIG. 2. A PC-HBF transmitter is shown in View (a) of FIG. 2 for comparison. In the FC-HBF transmitter, independent baseband data streams are upconverted using a complex-quadrature mixer. Outputs $y_1$ and $y_2$ are then split into N identical paths. Complex-valued weights are applied to each upconverted streams in polar form using a combination of a programmable phase shifter and a programmable gain amplifier. In the FC-HBF transmitter, weighted signals from the individual streams are combined and then input to power amplifiers (PA). Each PA drives a single antenna element with the requisite amount of power. Implementation of the phase-shifters poses several difficulties including large size, high insertion loss, relatively low port impedances, limited bandwidth and non-linear control characteristics.

A second embodiment of the FC-HBF transmitter uses a similar architecture to the first embodiment but realizes the complex-valued weights using a vector modulator, as shown in the inset of FIG. 2. A vector modulator is a combination of a quadrature hybrid (QH) and a pair of programmable-gain active amplifiers or programmable-loss passive attenuators. While this approach overcomes some of the aforementioned shortcomings associated with the phase-shifter approach, it still suffers from large size, high loss, low-port impedances and limited bandwidth.

Figure 3:
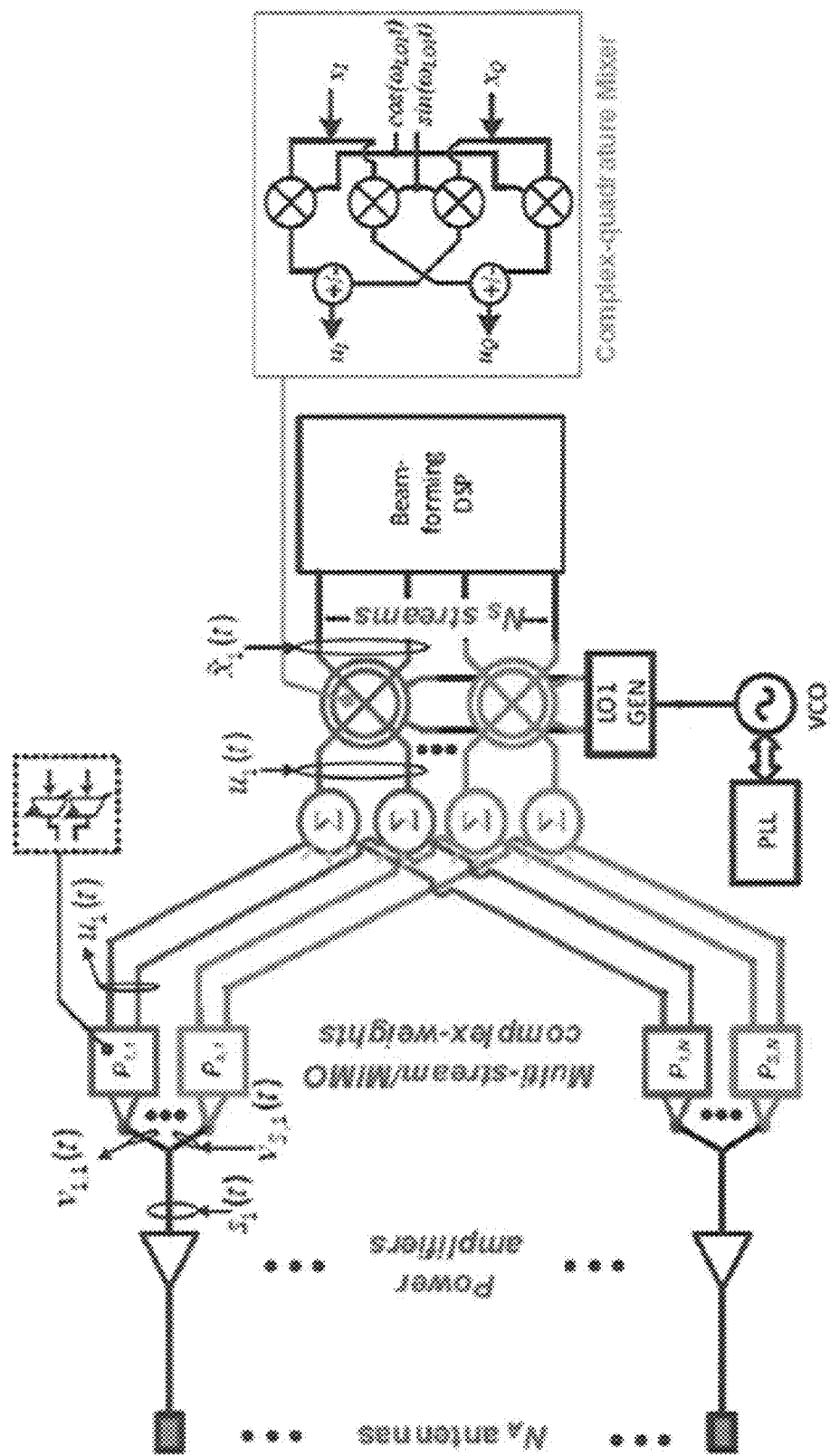
FIG. 3 shows a block diagram of a fully-connected beamforming transmitter using Cartesian weighting and splitting, representing a third embodiment of the invention.

A third embodiment, which overcomes all the aforementioned challenges, is illustrated in FIG. 3. Here, each baseband stream is upconverted using a complex-quadrature mixer (shown schematically in the inset of FIG. 3) to the RF carrier frequency and split into N paths. Per-stream and per-antenna complex-valued weights ($P_{s,k}$'s) are applied using a pair ($P_k$'s) of programmable-gain amplifiers. Weighted signals from all upconverted streams are then combined and input to PA's which drive the antenna elements.

The operation of the third embodiment can be described mathematically as follows. We represent the $s^{th}$ baseband stream by its baseband envelope $\tilde{x}_s(t)=(x_{s,I}+jx_{s,Q})$. The quadrature upconverted signal u(t) in the $s^{th}$ stream can be written as:

$$u_s(t) = u_{s,I} + ju_{s,Q} = \tilde{x}_s(t)e^{j\omega_{RF}t} \quad (1)$$
$$= (x_{s,I} + jx_{s,Q})e^{j\omega_{RF}t}$$
$$= (x_{s,I}C - x_{s,Q}S) + j(x_{s,I}S - x_{s,Q}C)$$

For the $s^{th}$ stream and the $k^{th}$ antenna, the objective is to apply a programmable complex-valued weight $P_{s,k}=P_{Re-s,k}+jP_{Im-s,k}$ to the envelope of the signal ($u_{s,I}+ju_{s,Q}$), i.e.:

$$v_{s,k}(t) = \text{Re}[P_{s,k} \cdot \tilde{x}_s(t) \cdot e^{j\omega_{RF}t}] \quad (2)$$
$$= \text{Re}[P_{Re-s,k} + jP_{Im-s,k})(x_{s,I} + jx_{s,Q})e^{j\omega_{RF}t}]$$
$$= P_{Re-s,k}(x_{s,I}C - x_{s,Q}S) - P_{Im-s,k}(x_{s,I}S - x_{s,Q}C)$$

Note that the last line of Eq (2) comprises only real-valued terms, which can be implemented using programmable gains $P_{Re-k,s}$ and $jP_{Im-s,k}$. Finally, the weighted, upconverted signals from all streams are combined to produce the signal that drives the $k^{th}$ antenna:

$$S_k(t)=\Sigma_{s=1}^{S}v_{s,k}(t)=\Sigma_{s=1}^{S}\text{Re}[P_{s,k}\cdot\tilde{x}_s(t)\cdot e^{j\omega_{RF}t}] \quad (3)$$

Thus, it is seen that the third embodiment is a schematic representation of the above signal processing.

Bidirectional Transmit-Receive

Figure 4:
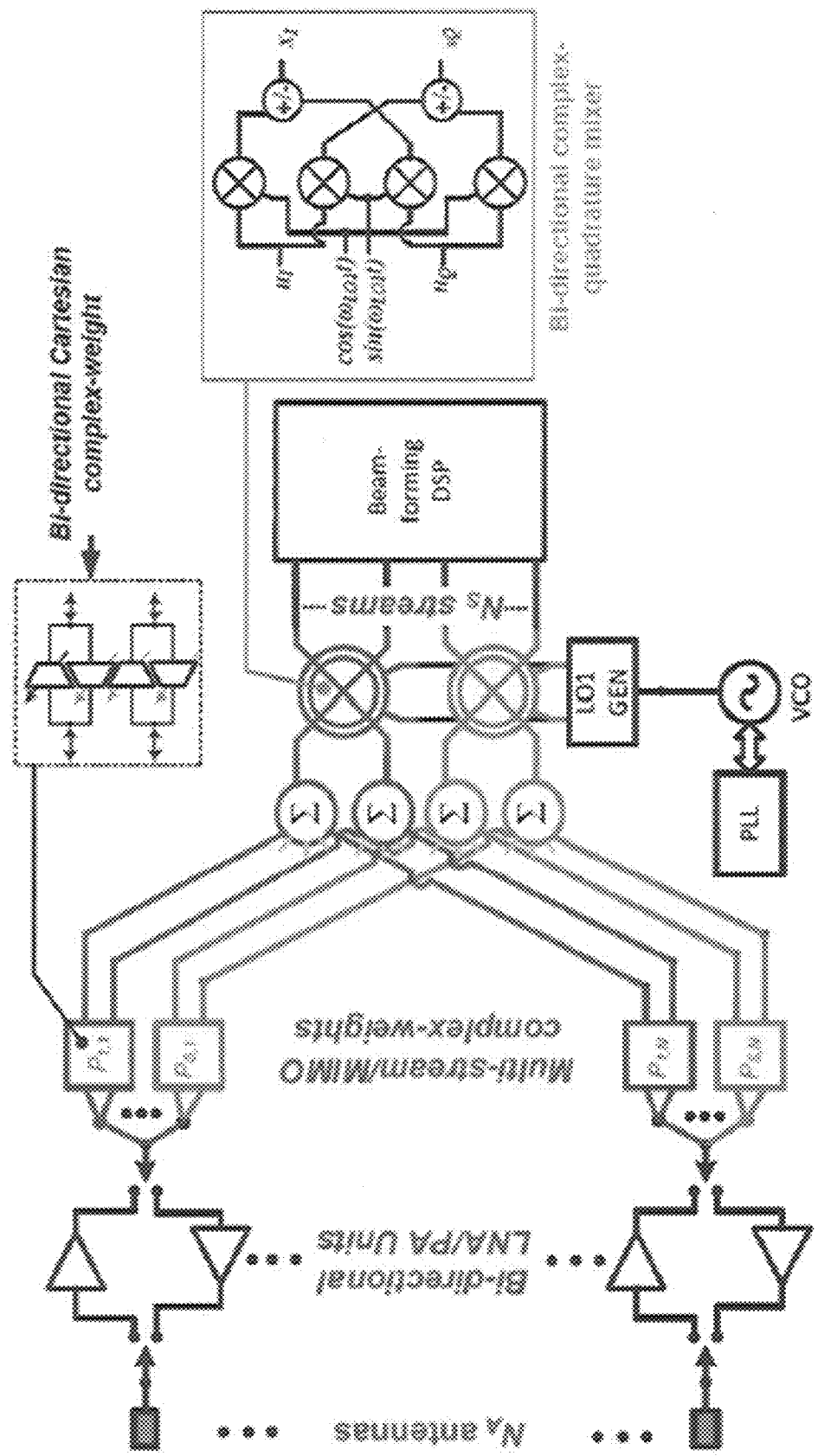
FIG. 4 shows a block diagram of a fully-connected, hybrid beamforming transceiver configured to pass signals in both directions using the transmitter shown in FIG. 3.

The FC-HBF transmitter described above can be combined with the FC-HBF receiver architecture described in U.S. patent application Ser. No. 16/163,374 to realize a bi-directional FC-HBF transceiver. A schematic illustration of a transceiver based on a second embodiment of the invention as described above is shown in FIG. 4. Here, the programmable-gain amplifiers used to realize the complex-valued weights are designed such that they can be configured to pass signals either in the forward direction only or in the reverse direction only.

Carrier Aggregation

Due to the availability of multiple downconversion chains, HBF's inherently able to support carrier aggregation (where independent data can be received at multiple frequencies), thereby increasing data rate. However, in a PC-HBF, a separate sub-array is required for each aggregated carrier. On the other hand, in a FC-HBF, the same antenna array can be used to transmit or receive several aggregated carriers. Specifically, an FC-HBF can support aggregation of as many carriers as the number of available frequency translation chains. This is a significant advantage of the FC-HBF. In addition, the FC-HBF achieves higher beamforming gain for each carrier-aggregated signal or stream.

Figure 5:
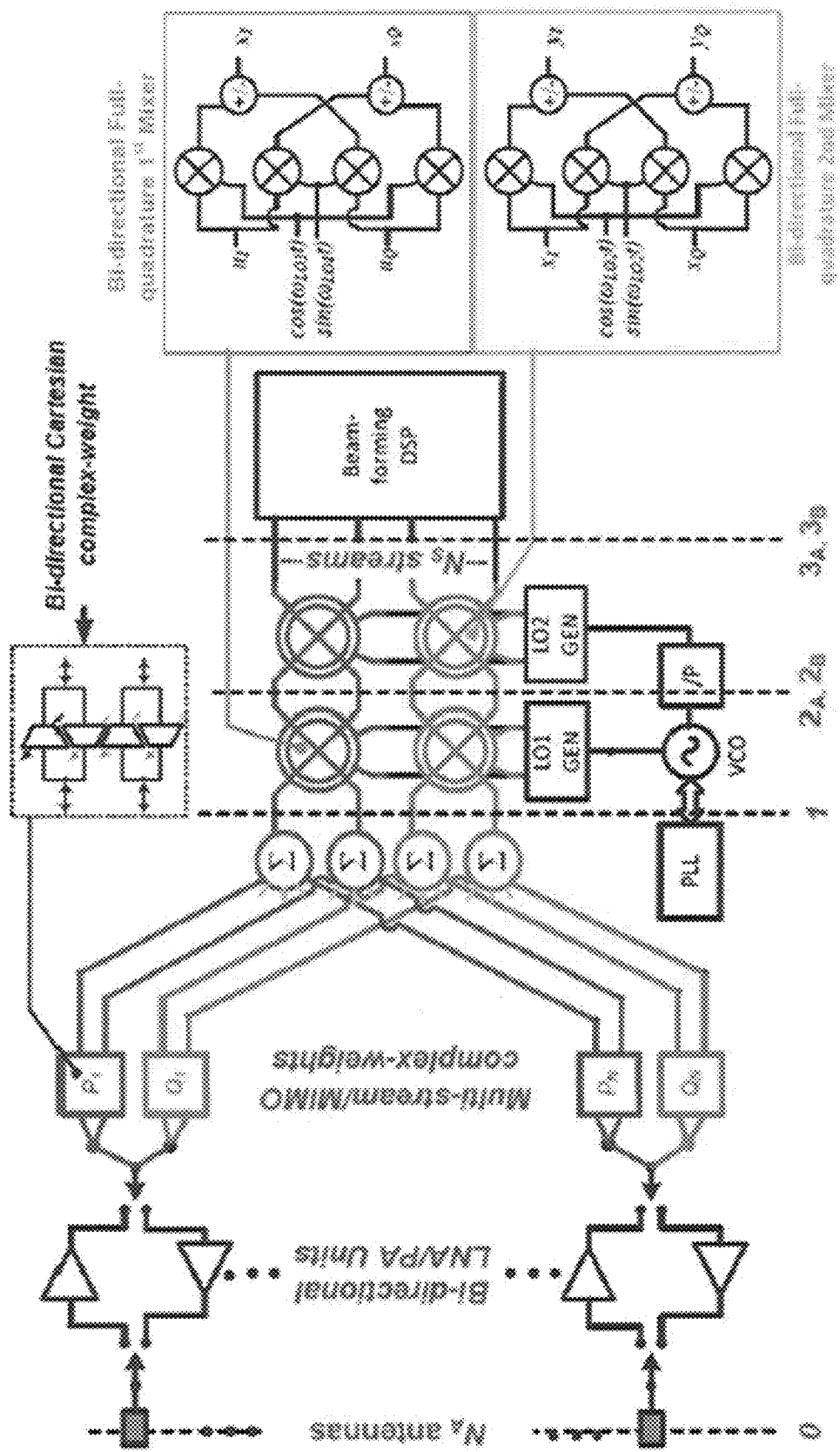
FIG. 5 shows a block diagram of a fully-connected bidirectional hybrid beamforming transceiver using Cartesian weighting and splitting/combining heterodyne conversion.

In the FC-HBF described herein, direct conversion was assumed, which means that the baseband streams are translated to the RF carrier in a single step. In this architecture, a dedicated local oscillator (LO) generation circuit per stream is required for carrier aggregation. FC-HBF using a heterodyne architecture can be advantageous for carrier aggregation. By performing per-antenna-per-stream complex weighting using multiple frequency translation steps, functionality similar to a direct conversion FC-HBF can be obtained. An example of a heterodyne architecture using a single intermediate frequency (IF) is shown in FIG. 5. Here, complex-quadrature mixers are used for both frequency translation steps.

The operation of the heterodyne FC-HBF in carrier aggregation mode will now be described. Assume that the local oscillator is tuned to a frequency $\omega_{LO}$ such that a high-band RF frequency $\omega_{RFA}$ and a low-band RF frequency $\omega_{RFB}$ can be accessed by frequency translation to/from baseband through the intermediate frequency $\omega_{IF}$. Note that the two RF bands are mutual images at this LO frequency. The spectra at various points in the signal chain are shown FIG. 6 using an example with two streams. The front-end beamforming weights are configured such that the array pattern in each stream is steered towards the direction of departure (or arrival) of one of the signals. The frequency translation chain in each stream is configured to translate one of the two signals to baseband while rejecting the other.

Figure 6:
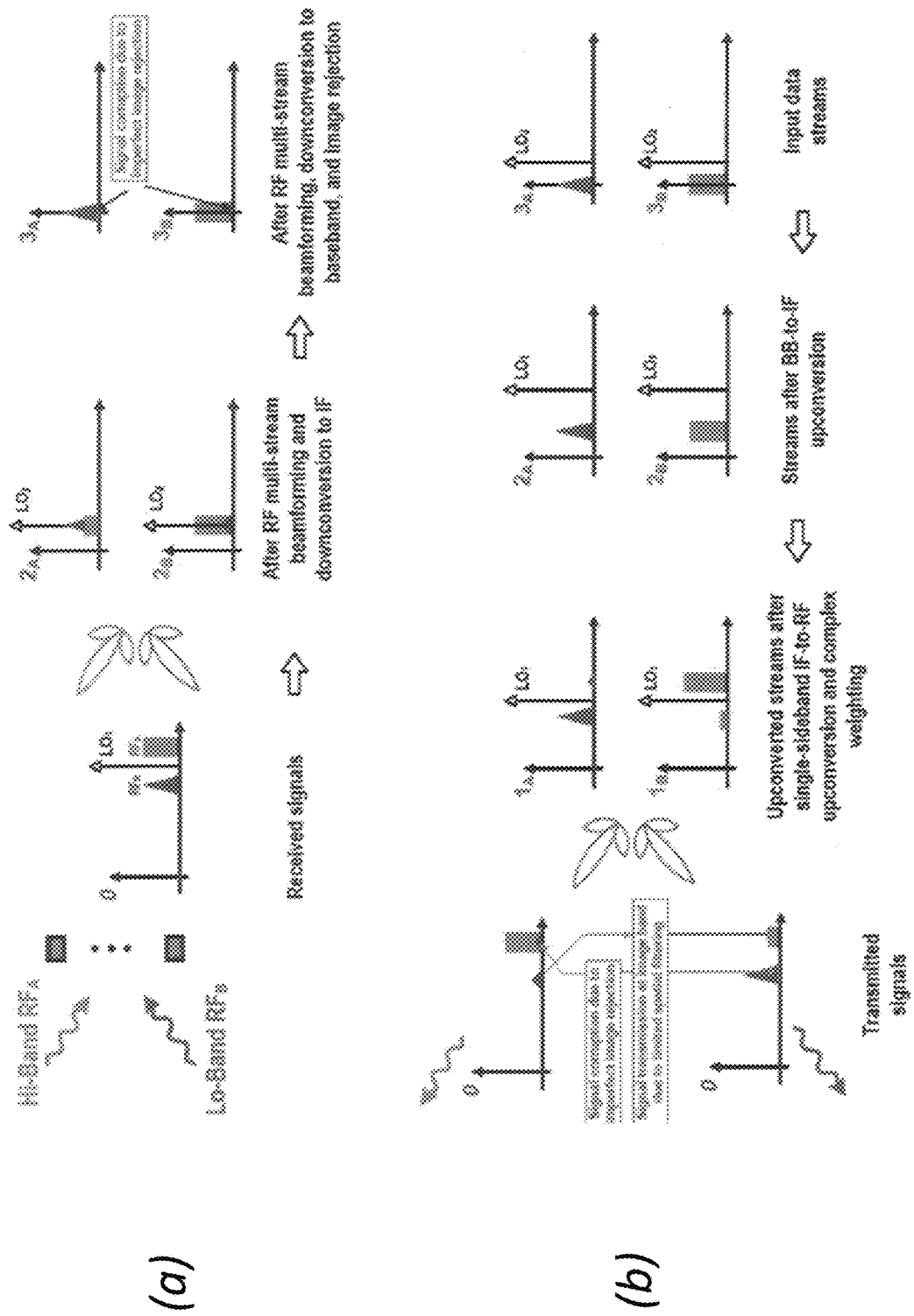
FIG. 6 shows the spectra of waveforms in the signal chain in the receive, in View (a), and transmit, in View (b), paths of the bidirectional fully-connected hybrid beamformer.

In the receive path, in each stream, the I/Q outputs of the first complex-quadrature stage comprise the two signals downconverted to the same IF, as shown by waveforms 2A and 2B in View (a) of FIG. 6, with one of the signals being attenuated by the beamforming array pattern programmed for that stream. Then, in each stream, the second complex-quadrature stage is configured to downconvert to baseband either the low-band or the high-band signal while rejecting (cancelling) the other signal, as shown by waveforms 3A and 3B in View (a) of FIG. 6.

In the transmit path, with reference to View (b) of FIG. 6, independent baseband signals are first upconverted to $\omega_{IF}$ in each stream. The first complex-quadrature stage is configured for upconversion from $\omega_{IF}$ to either the high band ($\omega_{RFA}$) or the low band ($\omega_{RFB}$). Following this upconversion, independent beamforming weights for each stream are applied to steer the beams towards the desired directions of departure.

Digital Calibration to Enhance Image-Rejection

In both the transmit and the receive modes, the gains and phases of the quadrature paths should be matched accurately. In practice, inevitable on-chip device and layout mis-matches, which can be either random or systematic, cause mis-matches in the path gains and cause the quadrature phases to deviate from their nominal difference of 90°. Such mis-matches cause imperfect rejection of the image frequency signal which causes corruption of both the transmitted and the received signals.

Also disclosed herein is a method to calibrate such mismatches and mitigate their adverse effects. While the methods are applicable to any of the embodiments of the beamformer, it is particularly applicable to the second embodiment, shown in FIG. 3, the FC-HBF transmitter using Cartesian weighting and splitting.

Figure 7:
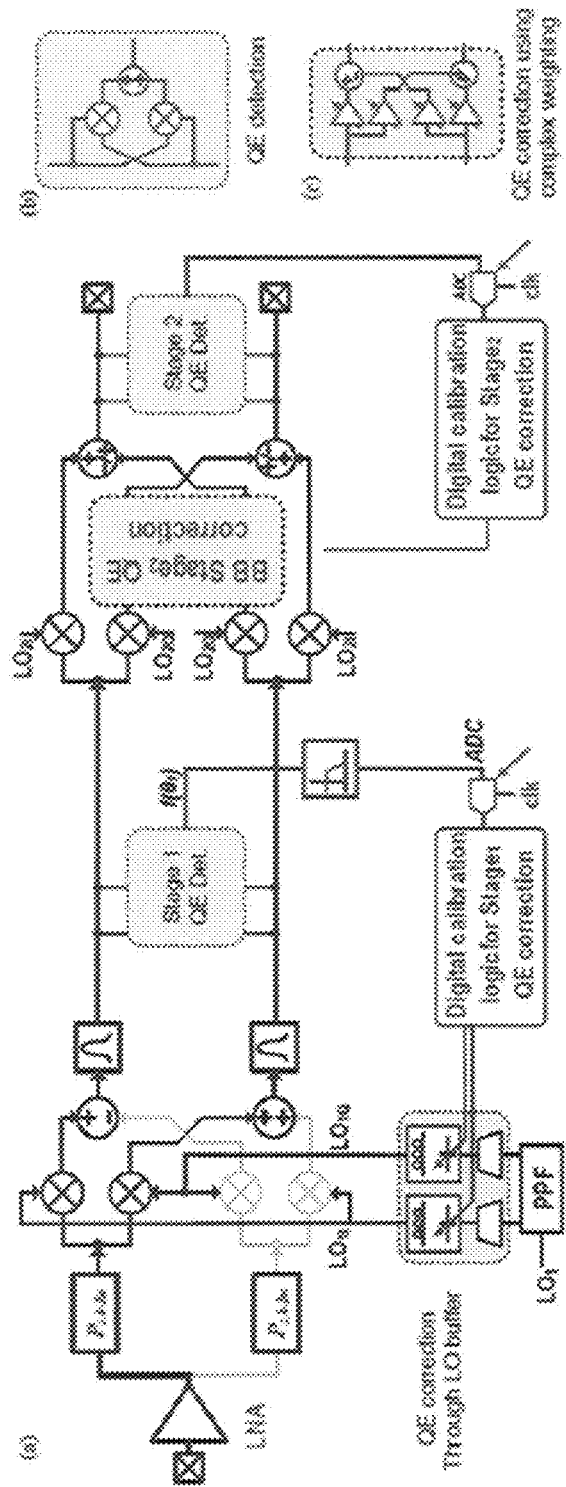
FIG. 7 shows a block diagram of method and an apparatus for calibration and gain/phase mismatch detection and mitigation.

In a single-antenna heterodyne receiver of the sliding-IF Weaver type, errors due to gain/phase mismatches in both mixing stages can be consolidated and corrected at baseband. However, in the case of the RF weighting HBF, the two mixing stages must be individually calibrated. The method and apparatus are shown in FIG. 7. The method comprises inserting a sinusoidal test signal at the input to the first complex quadrature stage. A quadrature error (QE) detector inserted at the output of this stage detects the deviation of the phase difference between these two signals from its nominal value of 90°. A robust embodiment of the QE detector that equalizes loading on the two inputs is shown in View (b) of FIG. 7. The output of the QE detector is lowpass filtered, digitized and then fed to a digital calibration which actuates a QE correction mechanism. Note that the low-resolution ADC, down to a single bit, can be used for digitization of the QE. Several mechanisms can be used for QE correction: (a) through the LO buffer, for example, via its resonant load, as shown in FIG. 7; (b) insertion of a Cartesian weighting circuit (i.e., a matrix rotation circuit), as shown in View (c) of FIG. 7; or (c) using statistical element selection within the complex quadrature mixer to tune mismatches using combinatorial redundancy.

Reconfiguration and Full-Duplex Beamforming

Figure 8:
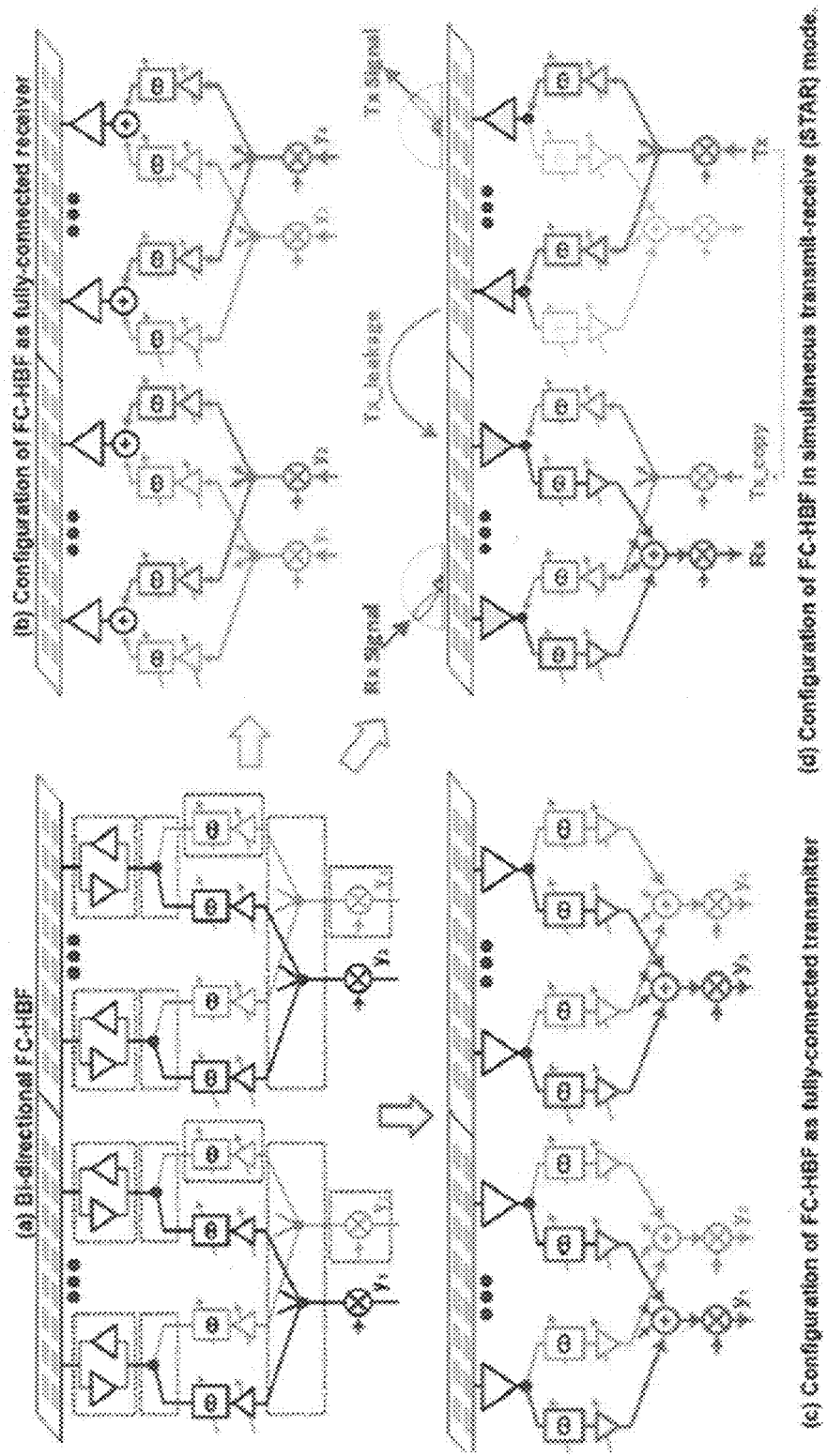
FIG. 8 shows block diagrams of different configurations of a bidirectional fully-connected hybrid beamformer.

Multiple tiles of the transceiver described herein can be used to support simultaneous transmit and receive (STAR) operation, as shown in View (d) of FIG. 8. STAR operation in separate frequency bands for transmit and receive is called frequency division duplex (FDD), which STAR operation in the same frequency channel is called full-duplex (FD) operation. In both cases, the overarching challenge in full-duplex communication is the self-interference (SI) from the strong transmitted signal leaking into the receive path and causing severe corruption of the weak received signal. In the case of FDD, some attenuation of this leakage is achieved by using a diplexer which provides high attenuation of the transmit signal in the receive path. However, such a mechanism is not available in the FD case, and therefore, signal cancellation of the transmit signal leakage is the only viable option.

There are two variants of FD systems: shared-antenna FD, where each antenna element is shared between the transmit and receive paths, and separate-antenna FD, where transmit and receive paths use completely separate antenna arrays. While the shared-antenna approach has gained interest in sub-6 GHz FD communication, the separate-antenna is advantageous at mm-wave for the following reasons: 1) At mm-wave, many antennas can be packed in a small form-factor. Therefore, separate antenna arrays can be used in transmit and receive paths; 2) The separate-antenna approach avoids the use of a circulator. Recent innovations have made on-chip integration of circulators possible, but they are lossy, have limited linearity and bandwidth, and achieve inadequate transmit-receive isolation. Furthermore, they occupy a large die area and are difficult to integrate into beamformers with large numbers of elements in a cost-effective manner; 3) More importantly, due to small antenna spacing at mm-wave, adjacent antennas experience significant coupling, and hence, suffer from severe SI from one antenna to the nearby antennas in a shared-antenna approach. However, in a separate-antenna approach, SI due to antenna coupling can be greatly reduced by increasing the physical spacing between the transmit and receive antenna arrays.

In the reconfigurable architecture described herein and shown in View (a) of FIG. 8, seamless reconfiguration can be achieved between several modes including a fully connected receiver, shown in View (b) of FIG. 8, a fully-connected transmitter, shown in View (c) of FIG. 8, and a partially connected STAR mode with built-in SI-cancellation. To this end, the built-in SI-canceler can cancel two types of self-interferences: (1) SI due to a nearby reflection of the transmitted signal that leaks into the receiver through the receive antenna array; and (2) SI through antenna coupling from the transmit to the receive antennas.

The first kind of SI is canceled by directing a null towards the reflection paths in both the transmit and receive beamformer. Note that nulls in the transmit and receive array pattern can be steered towards different leakage multipath components or can be steered towards the same path to achieve higher rejection.

The second kind of SI is canceled by using independent per-element single-tap RF-domain SI canceler at the receiver (inside the LNA) by using a copy of the transmitted signal in each path of the receive array, as shown in View (d) of FIG. 8. It is important to note that, in the architecture described herein, no extra hardware is necessary to perform this per element SI-cancellation technique. As shown in View (d) of FIG. 8, in the bidirectional FC-HBF, one stream in the receive array can be repurposed to transmit a copy of the transmit signal that can be independently complex weighted in each element to cancel the incoming transmit signal leakage. Moreover, this technique can also be used to cancel leakage through nearby reflections that have low group delay. Note that this SI cancellation mechanism is not available in the PC-HBF.

We claim:

1. A method by a fully-connected hybrid beamforming transmitter comprising the steps of:
    upconverting a plurality of input baseband data streams to a plurality of corresponding radio frequency (RF) carrier frequencies using a plurality of complex quadrature mixers;
    splitting each of the upconverted input data streams into a plurality of identical streams, each identical stream corresponding to an antenna element;
    applying complex-valued weights to each of the identical streams from each of the upconverted input data streams to produce a plurality of weighted streams;
    combining one of the weighted steams from each of the upconverted input data streams to form a plurality of combined streams;
    amplifying each of the combined streams; and
    driving each antenna element with one of the amplified, combined streams;
    wherein each of the RF carrier frequencies is in a different frequency band.

2. The method of claim 1 wherein upconverting each of the input baseband data streams to an RF carrier frequency requires a local oscillator, each local oscillator generating a different frequency.

3. The method of claim 1 wherein the fully-connected hybrid beamforming transmitter has a heterodyne architecture in which upconverting each of the plurality of input baseband data streams to a corresponding RF carrier frequency comprises:
    upconverting each of the input baseband data streams to an intermediate frequency using a first complex-quadrature mixer; and
    upconverting each of the input data streams at the intermediate frequency to one of the plurality of RF carrier frequencies using a second complex-quadrature mixer.

4. The method of claim 3 further comprising:
    generating a frequency $\omega_{LO}$ using a local oscillator; and
    accessing a high-band RF frequency $\omega_{RFA}$ and a low-band RF frequency $\omega_{RFB}$ by frequency translation of $\omega_{LO}$ through the intermediate frequency;
    wherein upconverting each of the input data streams at the intermediate frequency to one of the plurality of RF carrier frequencies comprises:
    upconverting the input data stream at the intermediate frequency to either a high-band RF frequency or a low-band RF frequency.

5. The method of claim 4 wherein the complex-valued weights are applied to each of the identical streams from each of the RF high-band or low-band carrier frequencies to steer beams transmitted from each of the antenna elements in a desired direction.

6. The method of claim 1 wherein applying complex-valued weights to each of the identical streams comprises:
    applying the complex-value weights in polar form using a combination of a programmable phase shifter and a programmable gain amplifier.

7. The method of claim 1 wherein applying complex-valued weights to each of the identical streams comprises:
    applying the complex-valued weights using a vector modulator.

8. The method of claim 1 wherein applying complex-valued weights to each of the identical streams comprises:
    applying the complex-valued weights using a pair of programmable gain amplifiers.

9. A fully-connected, hybrid beamforming transceiver comprising:
    a receiver portion wherein a plurality of inputs are received from a corresponding plurality of antenna elements, each of the plurality of inputs comprising a plurality of streams, the receiver portion comprising:
        circuitry, for applying complex weighting to each of the streams from each of the inputs;
        circuitry implementing a multi-stage combiner, for combining one stream from each of the inputs to produce a plurality of combined streams; and
        circuitry implementing a plurality of image-reject downconverters, each image-reject downconverter corresponding to one of the combined streams; and
    a transmitter portion comprising:
        circuitry implementing a plurality of upconverters for upconverting a plurality of input baseband data streams to a plurality of corresponding radio frequency (RF) carrier frequencies;
        circuitry for splitting each of the upconverted input data streams into a plurality of identical streams;
        circuitry for applying complex-valued weights to each of the identical streams from each of the upconverted input data streams;
        circuitry for combining one of the weighted steams from each of the upconverted input data streams to form a plurality of combined streams; and
        a plurality of amplifying circuits for amplifying the combined streams;
        wherein each of the antenna elements is driven by an output of one of the plurality of the amplifying circuits.

10. The transceiver of claim 9 wherein the transceiver is operated in simultaneous receive-transmit mode wherein the transmitter portion and the receiver portion are tuned to the same frequencies.

11. The transceiver of claim 10 wherein, in the receiver portion, the image-reject downconverters comprise:
circuitry implementing a two-stage mixer.

12. The transceiver of claim 11:
wherein a first stage of the two-stage mixer of the image-reject downconverters performs a heterodyne downconversion of the combined stream to an intermediate frequency using a signal having a first frequency; and
wherein a second stage of the two-stage mixer of the image-reject downconverters performs a heterodyne downconversion of each combined stream at the intermediate frequency to a baseband frequency using a signal having a second frequency.

13. The transceiver of claim 12 wherein the signal having the first frequency is generated by a local oscillator and further wherein the signal having the second frequency is derived from the signal having the first frequency.

14. The transceiver of claim 13 wherein the local oscillator frequency is chosen such that the frequency bands of the combined streams are located at mutual image frequency locations.

15. The receiver of claim 14 wherein each stage of the two-stage mixers can be configured to reject either the low-side or high-side band for each combined stream with the same local oscillator frequency.

16. The transceiver of claim 10 wherein, in the transmitter portion, upconverting each of the input baseband data streams to an RF carrier frequency requires a corresponding local oscillator, wherein each local oscillator generates a different frequency.

17. The transceiver of claim 16 wherein upconverting the input baseband data streams to their corresponding RF carrier frequency comprises:
performing a heterodyne upconversion of each of the input baseband data streams to an intermediate frequency using a first complex-quadrature mixer; and
performing a heterodyne upconversion of each of the input data streams at the intermediate frequency to one of the plurality of RF carrier frequencies using a second complex-quadrature mixer.

18. The transceiver of claim 17 wherein the transmitter portion:
generates a frequency $\omega_{LO}$ using a local oscillator; and
accesses a high-band RF frequency $\omega_{RFA}$ and a low-band RF frequency $\omega_{RFB}$ by frequency translation of $\omega_{LO}$ through the intermediate frequency;
wherein upconverting each of the input data streams at the intermediate frequency to one of the plurality of RF carrier frequencies comprises:
upconverting the input data stream at the intermediate frequency to either a high-band RF frequency or a low-band RF frequency.

19. The transceiver of claim 18 wherein the complex-valued weights are applied to each of the identical streams from each of the RF high-band or low-band carrier frequencies to steer beams transmitted from each of the antenna elements in a desired direction.

* * * * *